United States Patent
Bartusiak (10) Patent No.: US 7,892,384 B2
(45) Date of Patent: Feb. 22, 2011

(54) REMOVABLE ADHESIVE TAPE AND PULL TAB, AND METHOD OF FORMING

(75) Inventor: Joseph T. Bartusiak, Osseo, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 908 days.

(21) Appl. No.: 11/769,923

(22) Filed: Jun. 28, 2007

(65) Prior Publication Data

US 2009/0000722 A1 Jan. 1, 2009

(51) Int. Cl.
*B32B 37/00* (2006.01)

(52) U.S. Cl. .................. 156/247; 156/196; 156/229; 428/343

(58) Field of Classification Search .......... 156/196, 156/247, 229; 428/343
See application file for complete search history.

(56) References Cited

U.S. PATENT DOCUMENTS

| | | | |
|---|---|---|---|
| 4,024,312 A | 5/1977 | Korpman | |
| 5,103,970 A | 4/1992 | Nielson et al. | |
| 5,111,381 A | 5/1992 | Pigott et al. | |
| 5,491,012 A | 2/1996 | Lühmann et al. | |
| 5,516,581 A | 5/1996 | Kreckel et al. | |
| 5,759,342 A | 6/1998 | Luhman et al. | |
| 5,824,380 A | 10/1998 | Hagen | |
| 5,925,459 A | 7/1999 | Zimmermann et al. | |
| 5,935,669 A | 8/1999 | Leeuwenburgh | |
| 6,527,900 B1 | 3/2003 | Kreckel et al. | |
| 6,541,089 B1 | 4/2003 | Hamerski et al. | |
| 6,572,945 B2 | 6/2003 | Bries et al. | |
| 6,641,096 B2 | 11/2003 | Johansson et al. | |
| 6,641,910 B1 | 11/2003 | Bries et al. | |
| 7,506,450 B2 | 3/2009 | Spaulding et al. | |
| 2002/0009568 A1 | 1/2002 | Bries et al. | |
| 2002/0165477 A1 | 11/2002 | Dunshee | |
| 2003/0159961 A1 | 8/2003 | Hamerski et al. | |
| 2004/0071918 A1 | 4/2004 | Cohen | |
| 2006/0003129 A1 | 1/2006 | Thiele et al. | |
| 2009/0000972 A1 | 1/2009 | Bartusiak | |
| 2009/0004422 A1 | 1/2009 | Bartusiak | |

FOREIGN PATENT DOCUMENTS

| | | |
|---|---|---|
| DE | 33 31 016 C2 | 10/1984 |
| KR | 10-2007-0030316 A | 3/2007 |
| WO | WO 95/06691 | 3/1995 |
| WO | WO 98/06652 | 2/1998 |

*Primary Examiner*—Jeff H Aftergut
*Assistant Examiner*—Jaeyun Lee
(74) *Attorney, Agent, or Firm*—Kenneth B. Wood

(57) ABSTRACT

A stretch releasing adhesive tape with an improved pull tab is disclosed. Methods are provided by which a single tab film may be adhered to an elongated strip of stretch releasing adhesive tape to form a manually engageable pull tab at a selected location. Such a pull tab may be foldable so as to comprise an unobtrusive visual appearance and may also be extendable so that the pull tab may be grasped to activate the stretch release.

20 Claims, 5 Drawing Sheets

REMOVABLE ADHESIVE TAPE AND PULL TAB, AND METHOD OF FORMING

BACKGROUND

Stretch releasing adhesive tapes are useful in a wide variety of assembling, joining, attaching, and mounting applications. Such tapes are well known in the art and are often used, for example, in circumstances in which it is desired to attach an object to another object, and to be able to separate the objects without any lasting visual disfigurement of, or leaving adhesive residue on, either object.

U.S. Pat. No. 4,024,312 to Korpman discloses a highly conformable adhesive tape including a highly extensible and elastic backing film laminated with an adhesive layer. The backing film possesses a lengthwise elongation at break of at least about 200%. The tape is easily stretchable and may be removed from a surface by stretching the tape lengthwise in a direction substantially parallel to the surface.

German Patent No. 33 31 016 discloses a high elasticity, low plasticity adhesive film based on a thermoplastic lubber and tackifying resins, wherein the adhesive bond can be broken by stretching the adhesive film in the direction of the plane of the adhesive bond.

U.S. Pat. No. 5,516,581 to Kreckel et al. discloses a removable adhesive tape having a highly extensible and substantially inelastic backing coated with a layer of pressure sensitive adhesive. The adhesive tape can be removed from a substrate without damaging the substrate by stretching the tape in a direction substantially parallel to the surface of the substrate. The tape backing has a lengthwise elongation at break of from about 150% to about 1200%, a Young's modulus of at least about 2,500 psi to about 72,500 psi, and an elastic recovery of less than about 50% after being stretched and removed.

PCT International Publication No. WO 95/06691 discloses removable foam adhesive tape comprising a backing including a layer of polymeric foam, and a layer of pressure-sensitive adhesive coated on at least one surface of the backing. The foam layer of the backing has a thickness of about 30 to about 1000 mils, and the backing has a lengthwise elongation at break of from about 50% to about 1200%, and a Young's modulus of less than about 2,400 psi.

Figure 1:
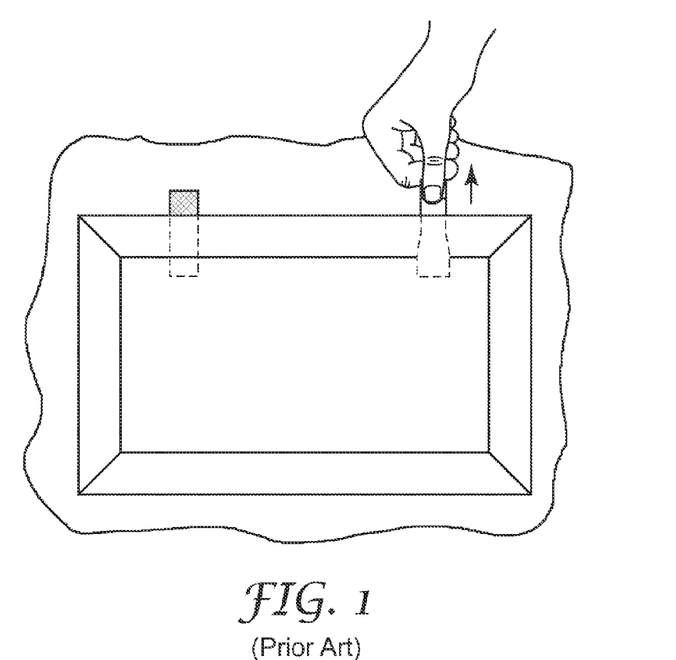
FIG. 1 is a front view of a bonding system of the art.

Conventional use of stretch releasing adhesive tapes may involve the existence of a visible pull tab, as pictured in prior art FIG. 1. Often, the adhesive surface of a particular portion of the stretch releasing adhesive tape is rendered non-adhesive (e.g. by application of a coating, lamination of a film, etc.) so that this portion of the adhesive tape serves as the pull tab.

PCT International Publication No. WO 98/06652 discloses a length cutting fixture which can be used to form a pull tab or "gripper" at the end of a long length of a conventional single-sided adhesive tape. The length cutting fixture also serves to cut the long length of tape, now including the gripper to any desired length. The gripper is formed by folding the end of the tape back onto itself.

U.S. Pat. No. 5,491,012 to Luhmann et al. discloses a strip of an adhesive film for a re-releasable adhesive bond, one end of the strip being provided on both sides with a UV-opaque covering which at the same time serves as a tab for pulling.

U.S. Pat. No. 6,641,910 to Bries and Johansson discloses a stretch releasing tape that includes a segmented liner that can be used to form a manually engageable pull tab.

SUMMARY

Applicant discloses kits and methods for bonding objects together. Often, an elongate length of stretch releasing adhesive tape is used for such an application. Such a stretch releasing tape typically comprises a non-adhesive portion (often called a pull tab) that can be grasped and pulled by a user to activate the stretch release properties of the tape and thus remove the tape and separate the objects. Applicant herein discloses kits and methods that can provide a pleasing visual appearance by virtue of a pull tab which may be unobtrusive, or partially or completely hidden.

Applicant also discloses an elongated strip of stretch releasing adhesive tape to which can be adhered a single tab film to form a manually engageable pull tab at a selected location. The stretch releasing adhesive tape can be supplied to the user as discrete strips, or as a sheet from which discrete strips can be subdivided, or in roll form. If a roll is supplied, the user can cut a discrete strip of any desired length from the roll and use the tab film to form a pull tab at a desired location on the strip (for example, at a terminal end of the adhesive strip).

The tab film may be supplied as multiple individual pieces, which may be packaged with the adhesive tape, but are not in contact with the adhesive surface of the tape. If the adhesive tape is supplied as a roll, the tab pieces can be packaged in a dispenser which may be disposed on or arranged within the core around which the adhesive tape roll is wound. Or, the dispenser itself may comprise a core; for example, a molded plastic piece may be utilized which functions both as a holder/dispenser for the tab film pieces, and as a core about which the adhesive tape is wound.

The tab film pieces may be comprised of a film with an adherable surface that is capable of strong bonding to the adhesive surface of the stretch release tape. Such a construction can offer superior bonding power over constructions that involve the use of release liners to form pull tabs.

In one embodiment, an area of one major surface of the tab film is attached to one major adhesive surface of an elongate piece of the adhesive tape to form a first tab/tape bonded area; and, another area of the same major surface of the tab film piece is attached to the other major adhesive surface of the tape to form a second tab/tape bonded area, so as to form a tab. In one embodiment, the formed tab may protrude beyond the terminal edge of the elongate piece of adhesive tape. In a further embodiment, the tab is movable into a folded position in which at least a part of the protruding tab portion is in overlapping relation with at least a portion of a tab/tape bonded area. In such a configuration, the tab may be partially or completely hidden behind an object that is bonded. In another embodiment, the tab is movable into a folded position such that a part of the protruding tab portion is in overlapping relation with at least a portion of a first tab/tape bonded area, and another part of the protruding tab portion is in overlapping relation with at least a portion of a second tab/tape bonded area. In another embodiment, the tab is movable into an extended position. In a further embodiment, the tab may be movable between folded and extended conditions. Such an extendable and foldable tab may exhibit an extension ratio as defined herein.

Applicant thus discloses in one aspect a method of forming a non-adhesive protruding pull tab at an end of a length of stretch releasing adhesive tape, comprising: providing an elongate length of stretch releasing adhesive tape having first and second oppositely facing major surfaces, both surfaces comprising adhesive; providing a single piece of tab film having first and second oppositely facing major surfaces, at least one major surface being adherable; contacting a first area of the adherable major surface of the tab film with an adhesive-containing area of the first major surface of the adhesive tape, said area being, at the terminal end of the adhesive tape, to form a tab/tape bonded area; wrapping the tab film around the terminal end of the adhesive tape such that a portion of the tab film protrudes past a terminal edge of the terminal end of the elongate length of stretch releasing adhesive tape; and, contacting the adherable major surface of the tab film with an adhesive-containing area of the second major surface of the adhesive tape, said area being at the terminal end of the adhesive tape, to form a tab/tape bonded area, wherein a non-adhesive pull tab comprising a protruding tab portion is formed at the terminal end of the elongate length of adhesive tape.

In various other aspects, applicant discloses kits and methods by which pull tabs may be attached to stretch releasing adhesive tapes by use of the pressure sensitive adhesive of the tape. The stretch releasing property of the adhesive tape may be activated by grasping and pulling the protruding portion of the pull tab, without grasping any portion of the adhesive tape itself. That is, pulling the tab may activate the stretch release so as to break the bond between the adhesive surface of the tape and the surface of the object(s) bonded, while maintaining the bond between the adhesive surface of the tape and the pull tab film surface. In one embodiment, the adhesive tape can be completely debonded from bonded objects by pulling the pull tab. In an alternative embodiment, the pull tab may be pulled so as to partially debond the adhesive tape from the bonded objects and partially stretch the adhesive tape, such that a portion of the adhesive tape protrudes sufficiently from between the objects so that the user can then grasp and pull the adhesive tape itself so as to finish debonding the adhesive tape.

DETAILED DESCRIPTION

Although terms such as "top", "bottom", "upper", "lower", "front" and "back", and "first" and "second" may be used in this disclosure, it should be understood that those terms are used in their relative sense only. For example, when a tab film is described as being attached to the first major surface (of two major surfaces) of a stretch release article, unless otherwise stated, such first surface could be either of the two surfaces. Also, in the Figures, like reference numerals are used to designate like features throughout. Drawings and elements therein are not to scale unless noted.

Figure 2:
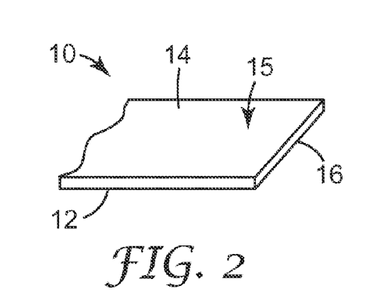
FIG. 2 is a perspective view of an elongate length of stretch releasing adhesive tape.

Referring first to FIG. 2, there is shown an article 10 comprising an elongate length of stretch releasing adhesive tape, comprising first major surface 12, second (opposite) major surface 14, and terminal end 15 which comprises terminal edge 16. In the embodiment illustrated in FIG. 3, article 10 is provided as a discrete length 18 with second end 20. In an alternative embodiment (not pictured), stretch releasing adhesive tape material is provided in the form of a continuous sheet from which individual articles 10 can be separated. In yet another embodiment, stretch releasing adhesive tape material is provided in the form of a roll 22 (as pictured in FIG. 4) in which second end 20 is at the inner end of the roll. In this embodiment, stretch releasing adhesive tape can thus be provided as an elongated strip having an indefinite length from which multiple strips of selected length can be cut depending on the end use application.

Figure 3:
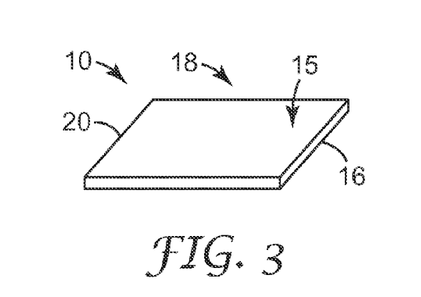
FIG. 3 is a perspective view of a discrete strip of stretch releasing adhesive tape.
Figure 4:
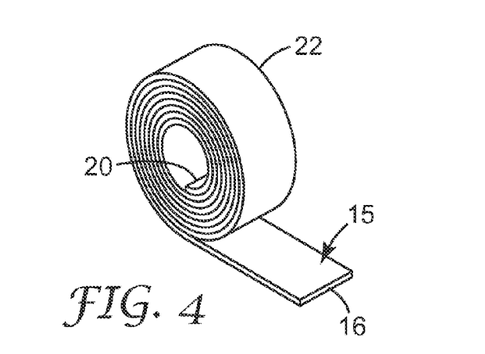
FIG. 4 is a perspective view of a roll of stretch releasing adhesive tape.
Figure 5:
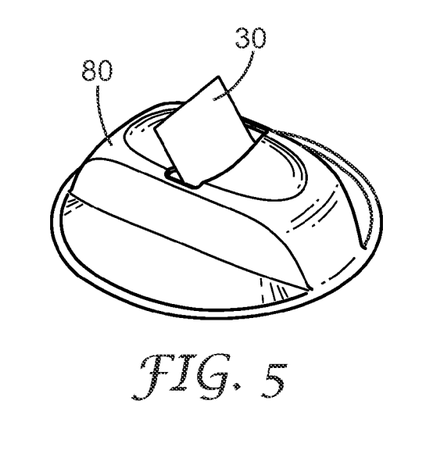
FIG. 5 is a perspective view of an exemplary dispenser for dispensing individual pieces of tab film.

The stretch releasing adhesive tape 10 comprises adhesive on first major surface 12 and second major surface 14. The adhesive can comprise any pressure-sensitive adhesive that can be adhered firmly to a substrate and thereafter removed therefrom by stretching the tape thus, a stretch releasing adhesive tape can comprise an elastic backing, or a highly extensible and substantially inelastic backing, with a pressure-sensitive adhesive disposed (e.g. coated) thereupon. Or the tape can be formed of a solid, elastic pressure sensitive adhesive. Thus, in this context, the term "tape" encompasses products that comprise a unitary, integral, or solid construction of adhesive (in addition to products that comprise a backing with separate layers of adhesive residing thereupon). Suitable stretch releasing tapes are described in U.S. Pat. No. 4,024,312 to Korpman; German Patent No. 33 30 31016; U.S. Pat. No. 5,516,581 to Kreckel et al.; and PCT International Publication No. WO 95/06691 to Bries et al.

One or both adhesive surfaces 12 and 14 can be supplied with a liner, i.e. a release liner, present. The liner or liners (not pictured in FIGS. 2-4) can be any conventional readily removable liner. Typical liners include a backing formed of, for example, paper, or a polymeric film such as polyethylene, polypropylene, or polyester, which is coated with a release agent such as a silicone, a fluorochemical, or any other conventionally known coating (for example, those coatings known in the art as low adhesion backsizes) that renders the surface substantially nonadhesive. An often preferred liner is silicone coated paper. Often, a liner with release agent present on both major surfaces is used with stretch releasing adhesive tapes, such that if the length of stretch releasing adhesive tape comprises a roll, one surface of the liner contacts adhesive surface 12, and the other surface of the liner contacts adhesive surface 14. In such a case only one release liner need be used. If present, such liners are typically removed when the stretch releasing adhesive tape is used.

A tab film 30 (as depicted in FIGS. 5-9) is also disclosed herein. A tab film 30 can comprise any film material with at least one adherable surface and which is sufficiently strong as to form a usable tab. An adherable surface refers generally to a surface that is capable of bonding to a pressure-sensitive adhesive (such as those typically used in stretch releasing adhesive tapes, and described in further detail in, e.g. U.S. Pat. No. 5,516,581 to Kreckel et, al.) such that the tab film is not removable from the pressure sensitive adhesive, or is not removable without damaging the adherable surface of the tab film, the tab film material, the pressure sensitive adhesive of the stretch releasing tape, or the elastic backing (if present) of the stretch releasing tape. As such, an adherable surface may comprise any surface that does not comprise a release liner as described above. That is, an adherable surface refers to a surface that does not comprise a release coating, low adhesion backsize, treatment or ingredient such as a silicone or silicone containing material, a fluorinated or fluorine-containing material, a fluorosilicone material, or the like. Representative examples of materials suitable for tab films include polyolefins, such as polyethylene, including high density polyethylene, low density polyethylene, linear low density polyethylene, and linear ultra low density polyethylene, polypropylene, and polybutylenes; vinyl copolymers, such as polyvinyl chlorides, both plasticized and unplasticized, and polyvinyl acetates; olefinic copolymers, such as ethylene/methacrylate copolymers, ethylene/vinyl acetate copolymers, acrylonitrile-butadiene-styrene copolymers, and ethylene/propylene copolymers; acrylic polymers and copolymers; and combinations of the foregoing. Polyester based materials (e.g. poly(ethylene terephthalate), poly(butylene terephthalate), etc.) may also be used. Mixtures or blends of any plastic or plastic and elastomeric materials such as polypropylene/polyethylene, polyurethane/polyolefin, polyurethane, polycarbonate, polyurethane/polyester, can also be used. Cellulosic films (e.g. paper, cellophane, etc.) can also be used. Tab films can also be prepared from filled materials, such as, for example filled films, e.g., calcium carbonate filled polyolefins. Tab films can be made by any known method of film forming, such as for example, extrusion, co-extrusion, solvent casting, and the like. Clear films may be preferred for many applications.

The tab film material should have sufficient thickness and strength so as to not break or tear when the tab formed therefrom (described later) is gripped and pulled. That is the tab film 30) should survive the force used to activate the stretch release property of the stretch releasing adhesive tape. In various embodiments, the tab film can be at least about 12 microns in thickness. The tab film should not however be so thick as to be difficult to handle. In various embodiments, the tab film is at most about 75 microns or 150 microns in thickness.

The adherable surface of the tab film material may be treated to improve its ability to adhere to the adhesive surface of the stretch releasing adhesive tape. For example, corona discharge, plasma discharge, flame treatment, electron beam irradiation, ultraviolet radiation, chemical vapor deposition, acid etching, or chemical priming may be used. In one embodiment, a pressure sensitive adhesive is disposed on the tab film adherable surface to improve adhesion.

It may not be necessary that the other surface of the tab film be adherable as defined herein. However, this other surface should be readily graspable by the user, and may comprise a treatment (roughened surface, etc.) so as to provide enhanced grippability. Other treatments may be used as desired as discussed in detail later herein.

In various embodiments, either or both of the adherable surface and the graspable surface may be treated in specific areas so as to provide different properties in different areas of that surface, e.g. by stripe coating, pattern coating, and the like. For example, areas of higher adhesion properties (achieved by printing, or by coating adhesive, etc.) may be provided. Instead of this, or in addition to this, areas of lower adhesion properties (achieved by coating release agents, etc.) may be provided.

Figure 6:
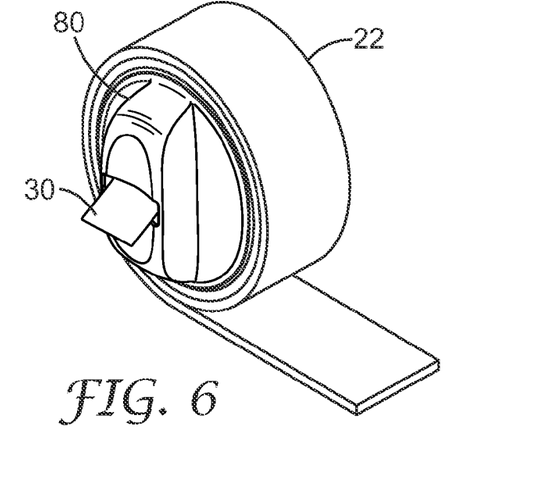
FIG. 6 is a perspective view of an exemplary tab film dispenser which is attached to a roll of stretch releasing adhesive tape.

In various embodiments, the tab film 30 may be provided in a kit together with the stretch releasing adhesive tape. The tab film may be present as discrete pieces, or in roll form from which discrete pieces may be detached. When provided as discrete pieces, the tab film pieces 30 can be packaged in a dispenser, for example the exemplary pop-up dispenser 80 depicted in FIG. 5, such that one piece of tab film 30 at a time can be removed for use. When used in combination with a roll 22 of stretch releasing adhesive tape, tab dispenser 80 can be mounted to the roll 29 of stretch releasing adhesive tape, as depicted in FIG. 6.

Figure 7:
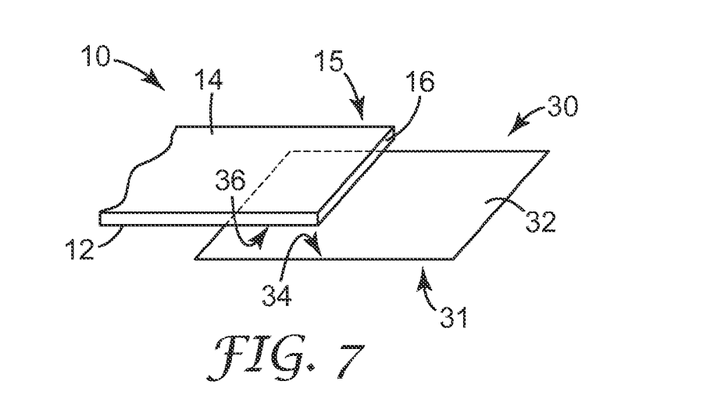
FIG. 7 is a perspective view of a piece of tab film and an elongate length of stretch releasing adhesive tape.
Figure 8:
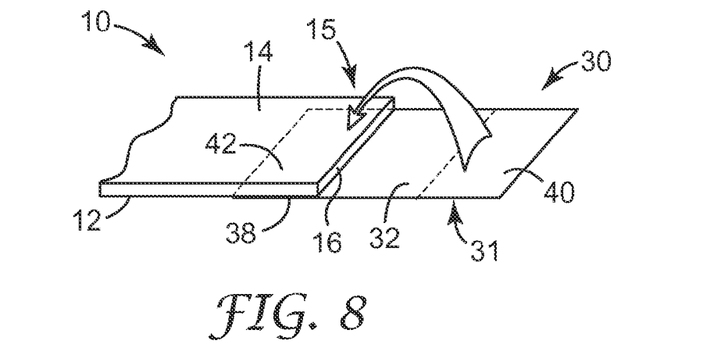
FIG. 8 is a perspective view of a piece of tab film being wrapped over a terminal edge of an elongate length of stretch releasing adhesive tape.

Referring now to FIG. 7, in one embodiment, an elongate length of stretch releasing tape 10 is provided. Adhesive area 36 is provided at least at the terminal end 15 of the first major surface 12 of the adhesive tape, (If a liner is present it is removed so as to expose at least adhesive area 36). A piece of tab film 30 is provided. A first region 34 of adherable surface 32 of the tab film 30 is brought into contact with, and adhered to, area 36, so as to form tab/tape bonded area 38 (pictured in FIG. 8). The tab film 30 is then wrapped around the terminal end 15 of the adhesive tape. In one embodiment, the tab film is wrapped in a direction parallel to the elongate length of the stretch releasing adhesive tape (e.g. wrapped around terminal edge 16 of terminal end 15 of the tape), as depicted in an exemplary manner in FIG. 8. In an alternative embodiment, the tab film is wrapped in a direction perpendicular to the elongate length of the stretch releasing adhesive tape (e.g. wrapped around a side edge of the tape), as depicted in an exemplary manner in FIG. 9. An adhesive area 42 is provided at least at the terminal end of the second major surface 14 of the adhesive tape (again, if present, a liner is removed to expose this area). A second region 40 of adherable surface 32 of the tab film is brought into contact with, and adhered to, adhesive area 42 so as to form tab/tape bonded area 39 (pictured in FIG. 10). In various embodiments, bonded areas 38 and 39 each are present for a distance of at least about 4, 8 or 12 mm along the elongate length of the tape from the terminal edge 16 of the adhesive tape.

Figure 10:
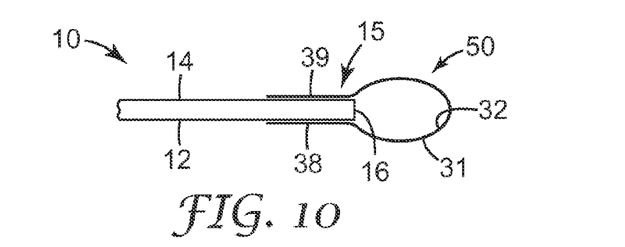
FIG. 10 is a side view of an exemplary protruding tab which is attached to both major surfaces of an elongate length of stretch releasing adhesive tape.

With reference to FIG. 10, the method provides a tab 50 at the terminal end 15 of an elongate length of adhesive tape 10. Tab 50 is attached to the stretch releasing adhesive tape via tab/tape bonded areas 38 and 39. In the embodiment illustrated in FIG. 1I, the tab protrudes beyond terminal edge 16 of terminal end 15 of the tape. However, in an alternative embodiment, the tab may be positioned so as to not protrude past terminal edge 16. In various embodiments the tab is movable into a folded position, and/or into an extended position, and may be interchangeable between the two positions, as discussed in detail below.

Figure 11:
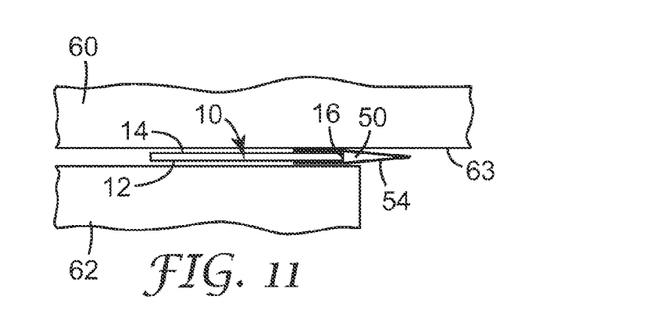
FIG. 11 is a side view of two objects bonded to each other by an elongate length of stretch releasing adhesive tape with an exemplary tab.

The elongate length of stretch releasing adhesive tape 10 can be used to bond two objects together. In one embodiment, shown in FIG. 11, the tab film comprises an extended position after the objects 60 and 62 are bonded together. Thus, for example, portion 54 of tab 50 may be visible protruding beyond the edge of object 62. In one embodiment the tab is made of clear material such that the tab is less visible. In another embodiment, a kit may be provided with multiple tab film pieces (e.g. packaged in a dispenser accompanying a roll of stretch releasing adhesive tape) in different colors. Thus in this embodiment, from a variety of tab films of different colors, a tab film may be chosen in a color that most closely matches the color of an adjacent surface of an object to be bonded (e.g., surface 63 of object 60).

Figure 12:
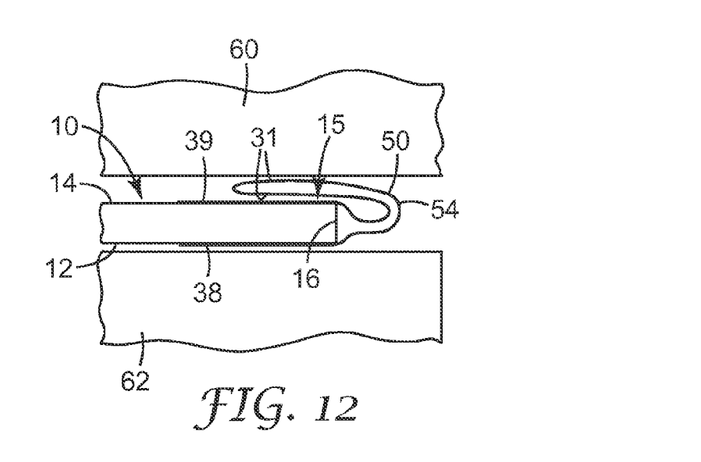
FIG. 12 is a side view of two objects bonded to each other by an elongate length of stretch releasing adhesive tape with a protruding tab in an exemplary folded position.

In another embodiment, shown in FIG. 12, tab 50 is movable into a folded position such that at least part of the protruding tab portion 54 is in overlapping relation with at least a portion of tab/tape bonded area 38 (or 39). This may allow at least part of protruding portion 54 to be partially or completely hidden behind object 62. In one embodiment, tab/tape bonded area 38 is sized and positioned such that the protruding portion of the tab film can be folded without coming into contact with the adhesive surface 14 of the tape. In an alternative embodiment, the tab/tape bonded area 38 is sized and positioned such that at least a part of the protruding portion of the tab can be folded so as to come into contact with at least a portion of adhesive surface 14, as explained later in detail.

Protruding tab portion 54 can be placed into a folded position prior to the stretch releasing adhesive tape being used to bond objects 60 and 62 together. Alternatively, the objects can be bonded together, after which protruding portion 54 can be folded into the space between bonded area 39 (or 38) and object 60 (or 62).

In this embodiment, the folded portion of the tab can remain partially or completely hidden until it is desired to activate the stretch releasing adhesive tape and debond objects 60 and 62. At that time, the tab can be unfolded (if desired, a small tool such as a wire unfolded paper clip, toothpick, etc. can be used in this operation) and moved into an extended position so that the user can grasp and pull it so as to activate the stretch release property of the adhesive tape. In one embodiment, when the tab is in an extended position the user can grasp and pull the protruding portion of the tab in order to activate the stretch release property of the tape, without grasping and pulling any portion of the stretch release adhesive tape itself.

Figure 9:
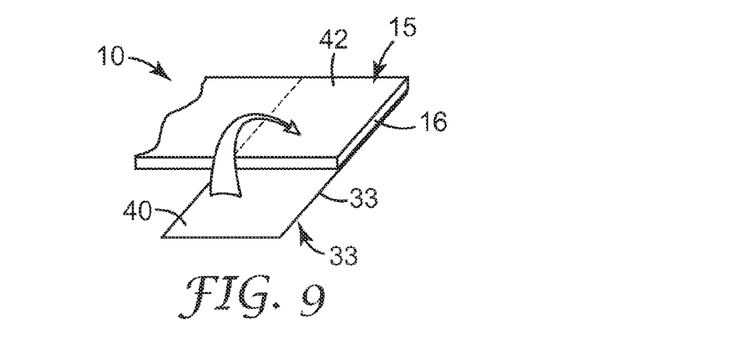
FIG. 9 is a perspective view of a piece of tab film being wrapped over a side edge of an elongate length of stretch releasing adhesive tape.
Figure 13A:
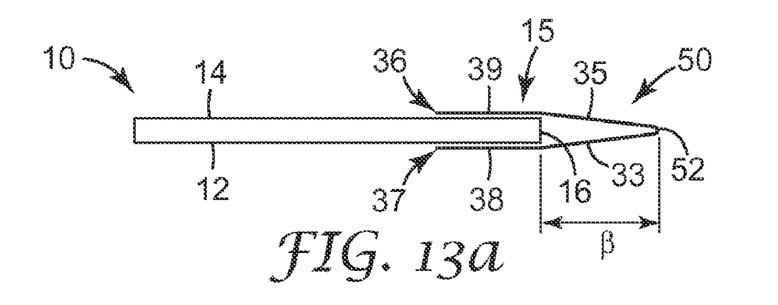
FIG. 13a is a side view of a protruding tab in an exemplary extended position.
Figure 13B:
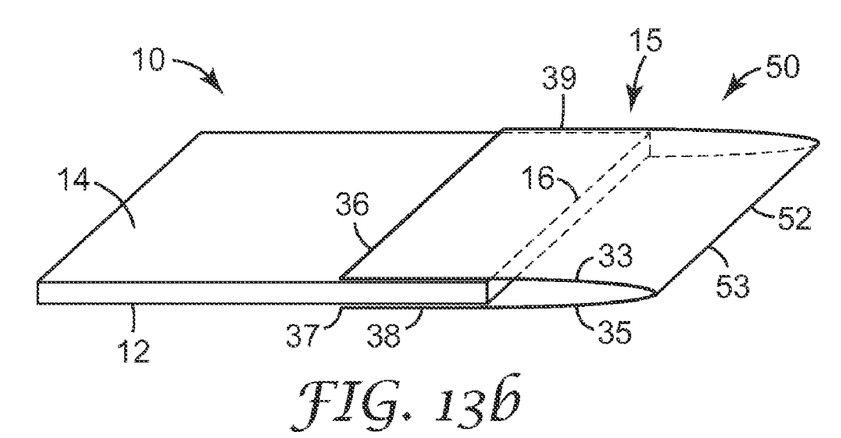
FIG. 13b is a perspective view of a protruding tab in an exemplary extended position.

An extended position generally designates a position in which the protruding portion of the tab is positioned such that it comprises a largely planar configuration in which tab film portions 33 and 35 are in close proximity or touching (as depicted in an exemplary manner in FIGS. 13a and 13b). When so extended, the point most distant (measured in a direction parallel to the elongate length of the tape, as are the other measured distances discussed herein) from the tape terminal edge 16 comprises point 52, which in various embodiments may be at least about 10 or 15 mm beyond terminal edge 16 of the adhesive tape. In various embodiments, point 52 may be at most about 30 or 40 mm beyond terminal edge 16. In one embodiment, in which the tab film is wrapped around the terminal end of the tape in a direction parallel to the elongate length, the most distant point 52 is a continuous part of the tab film (and may comprise a crease 53 as shown in FIG. 13b, as discussed later in detail). In an alternative embodiment, in which the tab film is wrapped around the terminal end in a direction perpendicular to the elongate length of the stretch releasing adhesive tape (as shown in FIG. 9), the most distant point may be formed by edge 33 of the tab film.

In one embodiment, the tab can be sized and positioned so that the fully-extended distance from terminal edge 16 to most distant point 52 (i.e. distance β in FIG. 13a) is less than the distance from tape terminal edge 16 to the edge 37 of tab/tape bonded area 38 (and/or less than the distance from tape terminal edge 16 to the edge 36 of tab/tape bonded area 39). In this embodiment, when the tab is folded (such as illustrated in FIG. 14), graspable surface 31 of the tab film will not come in contact with adhesive surface 12 or 14.

In an alternative embodiment, the tab can be sized and positioned so that the fully-extended distance from terminal edge 16 to most distant point 52 (i.e. distance β in FIG. 13a) is greater than the distance from tape terminal edge 16 to the edge 37 of tab/tape bonded area 38 (and/or greater than the distance from tape terminal edge 16 to the edge 36 of tab/tape bonded area 39). In this embodiment, when the tab is folded, surface 31 of the tab may be placed in contact with at least a portion of adhesive surface 12 or 14. Such a configuration may, be advantageous in a circumstance in which it is desired to hold the tab in a folded position by means of the adhesive, until such time as it is desired to unfold the tab. Accordingly, the tab may be sized and positioned such that when folded, an area of the protruding portion of the tab may be brought into contact with an area of adhesive surface 12 or 14 that is sufficiently large so as to hold the tab in a folded position, but is sufficiently small so as to allow the tab to be successfully detached from adhesive surface 12 or 14 and unfolded. In various embodiments, the tab may be sized and positioned such that such a tab/adhesive overlap area is present for a distance of at least about 2, 4 or 6 mm along the elongate length of the tape from edge 37 or edge 36 of a tab/tape bonded area. In alternate embodiments, the tab may be sized and positioned such that such a tab/adhesive overlap area is present for a distance of at most about 14, 12 or 10 mm along the elongate length of the tape from edge 37 or edge 36 of a tab/tape bonded area. In various additional embodiments, at least some portions of surface 31 of the tab film may be treated (e.g. by the use of priming treatments to increase adhesion, or low energy treatments so as to reduce adhesion) so as to achieve the desired balance of properties such that the folded tab can be adhered to the adhesive surface, but can be later released. Such treatments may be applied to the entirety of surface 31 of the tab film or may be applied in designated areas.

In an alternative embodiment, at least a portion of tab surface 31 may comprise adhesive (e.g. pressure-sensitive adhesive). In one embodiment, a portion of surface 31 that is in the protruding portion of tab 50 can comprise adhesive so as to be bondable to a portion of surface 31 that is in the tab/tape bonded area 38 or 39. Alternatively, a portion of surface 31 that is in the tab/tape bonded area 38 or 39 can comprise adhesive so as to be bondable to a portion of surface 31 that is in the protruding portion of tab 50. The amount of adhesive can be selected (for example, by pattern coating or stripe coating), and/or the adhesive composition can be selected so as to have a desired bonding power, so as to be able hold the tab in a folded position, until such time as it is desired to unfold the tab.

Figure 14:
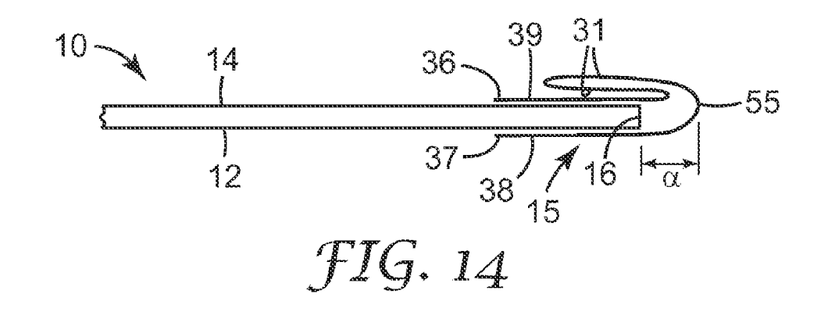
FIG. 14 is a side view of an elongate length of stretch releasing adhesive tape with a protruding tab in an exemplary folded position.

A folded position generally designates a position in which the protruding portion of the tab is positioned such that at least part of the protruding tab portion is in overlapping relation with at least a portion of tab/tape bonded area 38 or 39 (as depicted in an exemplary manner in FIG. 14). When so folded, the point most distant from the tape terminal edge comprises point 55.

As illustrated in FIGS. 13a and 14, an extension ratio can be defined as the ratio of the protrusion distance of the tab when extended (distance β from tape terminal edge 16 to most distant point 52, in FIG. 13a), to the protrusion distance of the tab when folded (distance α from tape terminal edge 16 to most distant point 55, in FIG. 14). In various embodiments, this β/α extension ratio can be at least about 3, 5, or 7.

In various embodiments, the tab film pieces comprise a crease or creases for ease of moving the tab into a folded position and/or maintaining it in that position, for ease of moving the tab into an extended position and/or maintaining it in that position, or both. Such a crease may comprise a linear zone in which the tab film material was treated (e.g. weakened, perforated, ablated, etc.) so as to provide the tab film with a tendency to fold preferentially along the linear zone. Or, such a crease may comprise a linear zone in which the film material was biased (folded, crimped, etc.) so as to provide the tab film with a tendency to fold preferentially along the linear zone, in a particular direction. In one embodiment, such creases are oriented parallel to the short axis of the tab film so as to be oriented transversely to the elongate length of the stretch release article (exemplified by crease 53 in FIG. 13b).

Figure 15:
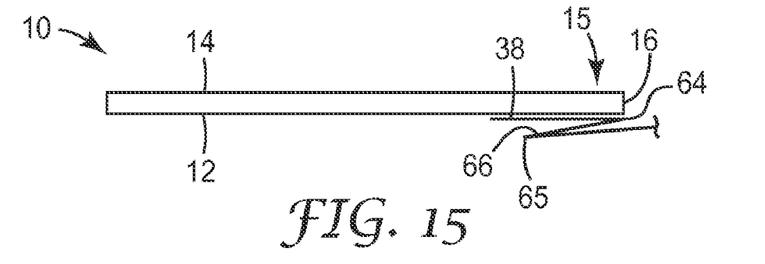
FIG. 15 is a partial side view of an elongate length of stretch releasing adhesive tape with a protruding tab in an exemplary Z-folded position.

In one embodiment, as mentioned previously, tab films may comprise a crease such that when the tab is placed in an extended position, crease line 53 is naturally formed at most distant point 52 (as illustrated in FIG. 13b). In another embodiment, multiple creases are provided in the tab film so that the tab can be placed in a E-folded position. An exemplary Z-foldable tab film is shown in FIG. 15, and possesses (at least) two transverse creases 64 and 65 which serve to allows at least one portion 66 of the tab film to be placed by the user in overlapping relation with tab-tape bonded area 38. In one embodiment, creases 64 and 65 are oppositely biased.

In another embodiment the tab film is sized and positioned appropriately, and the creases are positioned and spaced, such that tab/tape bonded area 38 is of greater extent in the elongated direction of the article 10 than is portion 66. In this embodiment, when tab is Z-folded (such as illustrated in FIG. 15), the tab is unlikely to come in contact with adhesive surface 12. Likewise, in one embodiment crease 64 is positioned even with terminal edge 16, such that adhesive surface 12 is not exposed in an alternative embodiment, the tab film is sized and positioned appropriately, and the creases are positioned and spaced, such that tab/tape bonded area 38 is of lesser extent in the elongated direction of the article 10 than is portion 66, such that tab portion 66 may be placed in contact with at least a portion of adhesive surface 12. As discussed above, such a configuration may be advantageous in a circumstance in which it is desired to hold the tab in a folded position by means of the adhesive, until such time as it is desired to unfold the tab.

Figure 16:
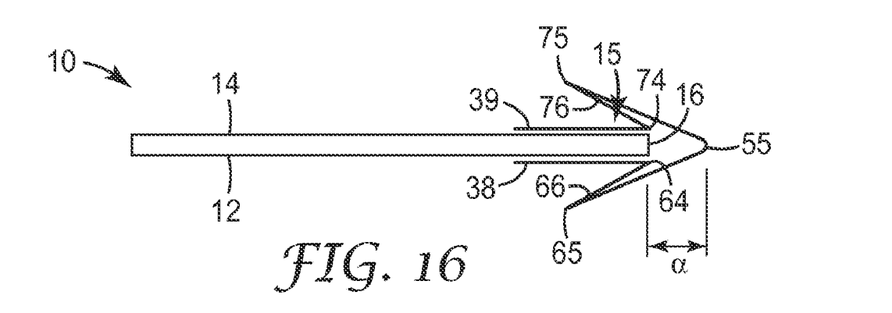
FIG. 16 is a side view of an elongate length of stretch releasing adhesive tape with a protruding tab in an exemplary dual Z-folded position.

An additional embodiment is shown in FIG. 16. In this dual Z-folded arrangement, at least four creases are provided: creases 64 and 65 as mentioned with reference to FIG. 15, and two similar creases 74 and 75 such that the tab can be Z-folded on the opposite side of the stretch release article, to similar effect. In various embodiments, creases 74 and 75 are oppositely biased; also, they may be spaced and positioned in similar manner as described above for creases 64 and 65, to similar effect. In addition to the creases that provide the dual Z-folded configuration, additional crease 53 can optionally be placed at the position of maximal extension, as mentioned previously.

Figure 17:
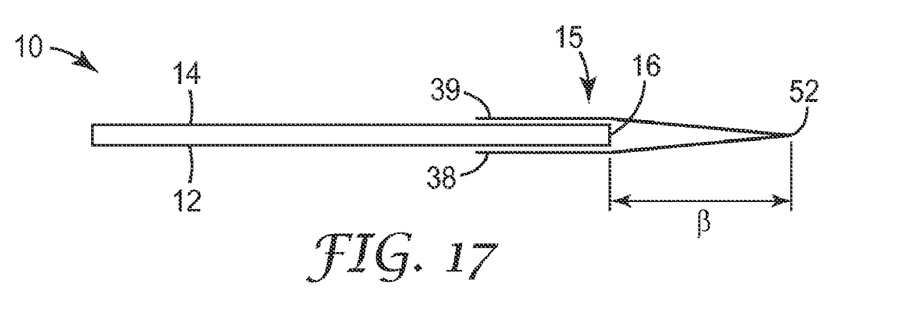
FIG. 17 is a side view of an elongate length of stretch releasing adhesive tape with a protruding tab in an exemplary extended position.

As shown in FIG. 16, tab 50 can be placed in a dual Z-folded position such that the tab protrudes a distance α. (This may be done after the stretch releasing adhesive tape is bonded to one or both of objects 60 and 62; preferably, however, the tab is folded prior to the stretch releasing adhesive tape being bonded to either of the objects.) When the stretch release is desired to be activated, the tab can be unfolded and moved (as described previously) to an extended position, such that the tab protrudes a distance β, as shown in FIG. 17. Such a dual Z-fold design may allow the tab to be provided with a high extension ratio, as defined previously herein. In various embodiments, this extension ratio can be at least about 3, 5 or 7.

Such creasing as described herein provides a ready made ability for the user to quickly and easily place the tab in a folded configuration, and to quickly and easily change the tab therefrom into an extended position. In various embodiments, the tab films can be supplied with at least one, two, three, four, or five creases. In various embodiments, kits can be supplied comprising stretch releasing adhesive tape along with tab film pieces which are pre-configured in a folded, Z-folded or dual Z-folded configuration. Tab film pieces may be packaged in a dispenser in any of these configurations. Alternatively, the tab film pieces can be supplied not folded (e.g. flat) but with creases such that the tab film pieces are easily foldable by the user.

In one embodiment, the elongate length of stretch releasing adhesive tape is provided as a discrete strip to which a tab can be attached at one or both terminal ends. Thus, after formation of the tab or tabs, the stretch releasing adhesive tape article is ready to be used to bond two objects together. In an alternative embodiment, in which the elongate length is part of a roll when a tab is attached, the elongate length is detached from the roll for use (after which a second tab can be attached to the other end if desired). For maximum flexibility, the roll may be provided such that a user can cut an elongate piece of any desired length. Alternatively, periodic lines of weakness (i.e. scores, perforations, etc.) can be provided transversely across the width of the stretch releasing adhesive tape, such that elongate lengths can be detached by tearing.

A number of embodiments of the invention have been described. Nevertheless, it will be understood that various modifications may be made without departing from the invention. Accordingly, other embodiments are within the scope of the following claims.

What is claimed is:

1. A method of forming a non-adhesive protruding pull tab at an end of a length of stretch releasing adhesive tape, comprising:

providing an elongate length of stretch releasing adhesive tape having first and second oppositely facing major surfaces, both surfaces comprising adhesive;

providing a single piece of tab film having first and second oppositely facing major surfaces, at least one major surface being adherable;

contacting a first area of the adherable major surface of the tab film with an adhesive-containing area of the first major surface of the adhesive tape, said area being at a terminal end of the adhesive tape, to form a tab/tape bonded area;

wrapping the tab film around the terminal end of the adhesive tape such that a portion of the tab film protrudes past a terminal edge of the terminal end of the elongate length of stretch releasing adhesive tape and is in non-contacting relation to the terminal edge; and, contacting a second area of the adherable major surface of the tab film with an adhesive-containing area of the second major surface of the adhesive tape, said area being at the terminal end of the adhesive tape, to form a tab/tape bonded area;

wherein a non-adhesive pull tab comprising a protruding tab portion is formed at the terminal end of the elongate length of adhesive tape.

2. The method of claim 1, wherein the formed pull tab is movable into a folded position in which at least a part of the protruding tab portion is in overlapping relation with at least a part of a tab/tape bonded area.

3. The method of claim 1, wherein the pull tab is movable into an extended position.

4. The method of claim 3, wherein when in an extended position the pull tab protrudes at least 10 mm beyond the terminal edge of the elongate length of adhesive tape.

5. The method of claim 1, wherein the pull tab is movable from a folded position into an extended position.

6. The method of claim 5, wherein the tab has an extension ratio of at least 5.

7. The method of claim 1, wherein the pull tab is movable into a Z-folded position.

8. The method of claim 7, wherein the pull tab comprises at least two creases.

9. The method of claim 8, wherein the creases are oppositely biased.

10. The method of claim 1, wherein the formed pull tab is movable into a folded position in which at least a part of the protruding tab portion is in overlapping relation with at least a part of a first tab/tape bonded area, and another part of the protruding tab portion is in overlapping relation with at least a portion of a second tab/tape bonded area.

11. The method of claim 1, wherein the pull tab is movable into a dual Z-folded position.

12. The method of claim 11, wherein the pull tab comprises at least four creases.

13. The method of claim 12, wherein at least two of the creases are oppositely biased.

14. The method of claim 11, wherein the tab has an extension ratio of at least 5.

15. The method of claim 1 wherein the tab film is wrapped around the terminal end of the adhesive tape in a direction parallel to the elongate length of the tape.

16. The method of claim 1, wherein the elongate length of adhesive tape is a discrete strip.

17. The method of claim 1, wherein the elongate length of adhesive tape is part of a continuous roll, and further comprising the step of separating the elongate length of adhesive tape from the roll after formation of the tab.

18. The method of claim 1, wherein at least one of the major surfaces of the adhesive tape comprises a liner, and wherein the method includes the step of removing at least a terminal portion of the liner from a terminal end of the adhesive tape to expose an adhesive-containing area of the first major surface of the adhesive tape.

19. The method of claim 1 wherein, from a multiplicity of tab film pieces of different color, the tab film piece is chosen which is the most similar in color to that of an object to be bonded.

20. The method of claim 1 wherein the stretch releasing property of the stretch releasing adhesive tape may be activated by grasping and pulling the protruding portion of the pull tab without grasping any portion of the adhesive tape itself.

* * * * *

UNITED STATES PATENT AND TRADEMARK OFFICE
CERTIFICATE OF CORRECTION

| | | |
|---|---|---|
| PATENT NO. | : 7,892,384 B2 | |
| APPLICATION NO. | : 11/769923 | |
| DATED | : February 22, 2011 | |
| INVENTOR(S) | : Bartusiak | |

It is certified that error appears in the above-identified patent and that said Letters Patent is hereby corrected as shown below:

First Page, Column 2
Line 6, In the abstract, delete "appearance" and insert -- appearance, --, therefor.

Column 1
Line 24 (approx.), delete "lubber" and insert -- rubber, --, therefor.

Column 1
Line 60 (approx.), delete "gripper" and insert -- gripper, --, therefor.

Column 3
Line 8, delete "being," and insert -- being --, therefor.

Column 3
Line 16, delete "area," and insert -- area; --, therefor.

Column 4
Line 2, delete "tape" and insert -- tape, --, therefor.

Column 4
Line 53, delete "tape thus," and insert -- tape. Thus, --, therefor.

Column 4
Line 63, delete "33 30 31016;" and insert -- 33 31 016; --, therefor.

Column 5
Line 18, delete "5-9)" and insert -- 5-8) --, therefor.

Column 5
Line 25, delete "et," and insert -- et --, therefor.

Signed and Sealed this
Twenty-second Day of November, 2011

David J. Kappos
*Director of the United States Patent and Trademark Office*

Column 5
Line 53, delete "polyurethane, polycarbonate," and insert -- polyurethane/polycarbonate, --, therefor.

Column 5
Line 56, delete "example" and insert -- example, --, therefor.

Column 5
Line 58, delete "as" and insert -- as, --, therefor.

Column 5
Line 63, delete "is" and insert -- is, --, therefor.

Column 5
Line 64, delete "30)" and insert -- 30 --, therefor.

Column 6
Line 16, delete "desired" and insert -- desired, --, therefor.

Column 6
Line 23, delete "printing," and insert -- priming, --, therefor.

Column 6
Line 36, delete "29" and insert -- 22 --, therefor.

Column 7
Line 2, delete "1I," and insert -- 10, --, therefor.

Column 7
Line 46, delete "wire" and insert -- wire, --, therefor.

Column 8
Line 28, delete "may," and insert -- may --, therefor.

Column 9
Line 36, delete "E-folded" and insert -- Z-folded --, therefor.

Column 9
Line 39, delete "allows" and insert -- allow --, therefor.

Column 9
Line 42, delete "embodiment" and insert -- embodiment, --, therefor.

Column 9
Line 50, delete "exposed in" and insert -- exposed. In --, therefor.

CERTIFICATE OF CORRECTION (continued)
U.S. Pat. No. 7,892,384 B2

<u>Column 10</u>
Line 17, delete "5" and insert -- 5, --, therefor.

<u>Column 12</u>
Line 9 (Approx.), In Claim 15, delete "1" and insert -- 1, --, therefor.